Patented Apr. 8, 1941

2,237,764

UNITED STATES PATENT OFFICE

2,237,764

PRODUCTION OF RUTILE PIGMENT

Robert Myers McKinney, Roselle, Del., assignor to E. I. du Pont de Nemours and Company, Wilmington, Del., a corporation of Delaware No Drawing. Application July 15, 1938, Serial No. 219,359

11 Claims. (Cl. 23—202)

This invention relates to a process for the production of titanium oxide pigments. More particularly, it relates to a process for the preparation of titanium dioxide pigments of rutile crystalline form and of high tinctorial strength. More specifically, the invention is directed to the preparation of rutile pigments by hydrolyzing titanium chloride solutions and separating the precipitated pigment from the hydrolysis liquors.

In the United States patent to Kubelka et al., No. 2,062,133, dated November 24, 1936, a useful process for the production of a high quality rutile titanium dioxide pigment is disclosed. Briefly, titanium chloride solutions are hydrolyzed in said process at elevated temperatures, as a result of which a suspension of raw rutile pigment in dilute hydrochloric acid is obtained. Separation of the raw pigment from the dilute acid must then be effected. Due to the fact that hydrochloric acid in dilute solutions acts as a peptizing agent for titanium dioxide, separation of the pigment from the acid becomes somewhat difficult and resort to complicated, time-consuming, and relatively costly separating operations is required.

It has been found that resort to these tedious, difficult and time-consuming separatory operations in rutile pigment production can be effectively obviated, and it is accordingly among the objects of the present invention to overcome the difficulties alluded to, as well as provide a novel method for obtaining such improved results. An additional object includes the provision of a novel process for the production of a superior, high-quality rutile pigment which will possess relatively high tinting strength values. A further and specific object of the invention is to provide a process for the separation of raw precipitated pigment from the acid liquor of hydrolysis, in such manner that peptization of the titanium dioxide is effectively avoided. Other and additional objects of the invention will appear as the ensuing description proceeds.

The foregoing and other objects are accomplished in this invention, which broadly comprises effecting hydrolysis of rutile titanium dioxide in the substantial absence of polyvalent anions or negative radicals, and thereafter effecting separation and calcination of the raw pigment thus produced, in the presence of polyvalent anions.

In a more specific embodiment, the invention comprises effecting hydrolysis of a titanium chloride solution while maintaining the same substantially or wholly free of polyvalent anions, and thereafter adding polyvalent anions to the resulting rutile suspension prior to a filtering or washing operation, to remove substantially all of the free hydrochloric acid from the rutile.

In one preferred adaptation of the invention to produce a titanium dioxide pigment in rutile crystalline state, a titanium chloride solution is hydrolyzed in substantially the same manner as is disclosed in the foregoing U. S. Patent 2,062,133. More particularly, a titanium chloride solution containing from about 3 to 4 mols of HCl per mol of titanium and about 50 or more grams of $TiO_2$ per liter is seeded with about 5% of a conditioned seed material, the resultant mixture being then heated to or near the boiling point until about 95% or more of titanium dioxide is precipitated. Hydrolyzing under these or similar conditions, or so as to maintain a relatively high concentration of titanium dioxide (above about 40 g./l.), insures production of a titanium dioxide pigment in rutile crystalline pattern. When hydrolysis is conducted under conditions where the titanium dioxide concentration is relatively low (below about 40 g./l.) or in the presence of substantial amounts of compounds which yield polyvalent anions, e. g., sulfuric acid, alkali sulfates, phosphoric acid, alkali phosphates, sodium oxalate, etc., induces anatase titanium dioxide production. This is undesirable since an additional step to convert the anatase to rutile is required, heating of the pigment to incandescence being necessitated. The anatase converted rutile pigment thus produced, however, is somewhat inferior, impairment in quality being due to such conversion, and is easily detected. The raw rutile pigment suspension in dilute hydrochloric acid which is obtained from the hydrolysis precipitation in accordance with this invention is subjected to cooling, permitted to stand for a period of 8 or 10 hours, and the resultant thickened slurry which forms is drawn off. This slurry is then diluted with sulfuric acid of about 20% strength and in an amount equivalent to about 10 parts of $H_2SO_4$ by weight per 100 parts of $TiO_2$. The resultant suspension is then conventionally filtered and washed and the hydrochloric acid-free pigment cake is then calcined at a temperature ranging from about 850 to 1050° C. After calcination, the pigment may be wet ground in a conventional milling device, such as a ball mill, and then dried and made ready for use, either alone or extended with various types of alkaline earth metal sulfate extenders, such as barium or calcium sulfate, or other inorganic pigment extenders, such as the silicas in general or magnesium silicate.

The product thus obtained will be found to consist of a high quality rutile pigment exhibiting satisfactory pigment properties, especially in respect to tinting strength and color. Thus, when its tinting strength is determined in accordance with the method described by J. E. Booge and H. E. Eastlack in the Paint, Oil and Chemical Review, April 16, 1924, it will be found that the pigment exhibits a tinting strength value in excess of 185, whereas a standard commercial quality titanium dioxide pigment graded in accordance with said method will exhibit a tinting strength value of only about 150. Similarly, when the color of the pigment product is determined in accordance with the method described by J. E. Booge and H. E. Eastlack in the Paint, Oil and Chemical Review, April 9, 1924, it will be found that the instant pigment will exhibit a color value of at least 19, whereas standard titanium dioxide pigments now commercially marketed grade about 18 on the same arbitrary scale.

To more particularly set forth the invention, the following specific examples thereof are given, each of which is merely illustrative in character, and to be considered as in no wise limiting:

*Example I*

A $TiCl_4$ solution was prepared by slowly adding 1 volume of water white titanium tetrachloride to 2 volumes of water, kept cool by brine. The resulting solution was later diluted to about 130 grams $TiO_2$ per liter with pure water. This solution was then ready for seeding to initiate the hydrolysis. The seed was prepared by adding a portion of this titanium solution to a 5% solution of caustic soda until a pH of about 2.5 was obtained. The resulting $TiO_2$ suspension was heated immediately after its preparation to 80° C. and held at this temperature for 20 minutes and then cooled to below 40° C. The cooled $TiO_2$ suspension was suitable for use as a seed material and was so used. One volume of the seed suspension was added to four volumes of the titanium chloride solution and the resulting mixture heated to the boiling temperature and so maintained for one-half hour. The titanium chloride was hydrolyzed almost completely and the hydrolysis product consisted of a raw rutile precipitate suspended in 20% HCl. This suspension was cooled and allowed to stand overnight. The thickened slurry was drawn from the bottom of the container and diluted with sulfuric acid of 20% strength in an amount equivalent to 10 parts of $H_2SO_4$ by weight per 100 parts of $TiO_2$. The resulting suspension was then filtered and washed on a batch vacuum filter. The washed cake was substantially free of hydrochloric acid and was calcined at 900° C. after the addition of 1.5 parts of $KHSO_4$ per 100 parts of $TiO_2$. The calcined pigment was wet ground in a ball mill and then dried. The pigment product consisted of a high grade, 100% rutile pigments, with a tinting strength value of 185 and a color value of 20, obtained in accordance with the methods already referred to.

*Example II*

A precipitated rutile suspension was prepared in the same manner as in Example I and the cooled slurry was likewise cooled and thickened. The thickened underflow was fed to the bowl of a continuous acid resistant rotary drum filter where it was further dewatered. The unwashed cake was repulped in 10% $H_2SO_4$ solution and subsequently filtered and washed on a vacuum leaf filter. The washed pigment was further processed, calcined and finished. On test, it was found to consist of 100% rutile, its high quality as a pigment being apparent from the fact that on test it exhibited a tinting strength value of 182 and a color value of 21, in accordance with methods of test already outlined.

*Example III*

A precipitated rutile suspension was prepared by hydrolysis as in the preceding examples. Fifteen parts of $H_2SO_4$ by weight in the form of strong sulfuric acid per 100 parts of $TiO_2$ were added to the hot hydrolysis slurry just prior to cooling but subsequent to substantially complete hydrolysis and the suspension was then cooled. Filtration and washing were accomplished by means of a displacement wash vacuum leaf filter. On being further processed and finished, as in Example I, the pigment after test was found to consist of 100% rutile, and to possess a tinting strength value of 190 and a color value of 20.

*Example IV*

The operations of Example II were repeated using oxalic acid instead of sulfuric acid in the same proportions. The resultant product was likewise calcined and finished, as in Example I, and determined to consist of 100% rutile, its quality as a pigment being apparent from the fact that on test it exhibited a tinting strength value of 187 and a color value of 19.

The foregoing examples involve preferred modes of applying the invention and illustrate manners in which the time-consuming difficulties of prior processes can be effectively eliminated and a high quality rutile pigment obtained. By a practice of the invention, hydrolysis may be effected in the substantially complete absence of any polyvalent negative anions, whereby production of a titanium dioxide in rutile crystalline form is insured, and practically all of the chloride ions are removed prior to calcination. Removal of the hydrochloric acid eliminates the possibility of its acting when in dilute state as a peptizing agent for the titanium dioxide, to render difficult separation of the pigment; and addition of a polyvalent anion after hydrolysis permits one to take advantage of the flocculating tendencies which such ions exert, whereby pigment separation is assisted and promoted. Again, calcination of the pigment without washing the raw $TiO_2$ to remove the hydrochloric acid is commercially impractical, due to the corrosive nature of the wet HCl gases emitted from the calcination and the tendency of the pigment to become contaminated with iron by condensation of the ferric chloride into the pigment. Accordingly, the invention makes possible rutile pigment calcination, without resort to hydrochloric acid-resistant, non-ferrous equipment which has heretofore rendered prior rutile pigment production processes less attractive commercially. Furthermore, the present process avoids the necessity of resorting to alternatives involving the above-mentioned troublesome pigment washing and the less difficult but exceedingly expensive process of neutralization prior to washing out the chloride salt which is produced. Such processes not only involve the consumption of an alkaline agent, such as soda ash, but also involve conversion of a portion of the valuable byproduct HCl into a dilute salt solution which is valueless.

As indicated, the rutile pigment of the present invention will be of unquestionably high quality, particularly in respect to tinting strength and color. In contrast, pigment products from prior processes will be definitely poorer and inferior. Thus, in demonstration of the effect which the presence or absence of polyvalent ions has upon the quality and production of rutile pigments, hydrolyses were effected under conditions similar to those of Example I, and in which either no polyvalent anion was added, or amounts up to .24 mols $H_2SO_4$ per mol of $TiO_2$ were utilized. In each instance, the time of hydrolysis was the same, or 30 minutes, at 95° C. The quality of the pigments calcined after simple filtration to obtain a firm cake in iron-free silica flasks at 850° C. will be apparent from the ensuing table:

*Table I*

| Pigment | Mol $H_2SO_4$, mol $TiO_2$ | Yield | Crystal form | Strength | Color |
|---|---|---|---|---|---|
| 1 | 0 | 98.8 | 100% rutile | 189 | 18 |
| 2 | 0.04 | 97.3 | 40% anatase | 137 | 17 |
| 3 | 0.12 | 92.0 | 60% anatase | 119 | 16 |
| 4 | 0.24 | 79.4 | 100% anatase | 112 | 10 |

Similarly, when hydrolyses were effected in the presence of other compounds yielding polyvalent anions, it was found that they exerted like deleterious effects upon the resultant pigment, and in some instances were up to 8 times more poisonous than the $H_2SO_4$ illustrated above. On a molar basis, phosphoric acid is about 8 times, hydrofluoric acid is about 3 times, and citric acid is about 6 times as effective as sulfuric acid, which seems to be one of the lesser poisonous polybasic acids. The salts of the acids mentioned are equivalents of the acids in this respect.

Although specific quantities and concentrations have been employed in the foregoing examples, these are not critical to the invention. For instance, although preferably hydrolysis of a titanium chloride solution containing from about 3 to about 4 mols of HCl per mol of titanium and about 50 grams of $TiO_2$ per liter is resorted to, a convenient and satisfactory operating range will be found to comprise from about 40 g./l. to about 175 g./l. of titanium dioxide, a preferred range consisting of from about 60 to about 130 g./l. of titanium dioxide. Similarly, although the suspension of titanium dioxide in dilute hydrochloric acid is preferably diluted with a sulfuric acid of about 20% strength and in an amount equivalent to about 10 parts of $H_2SO_4$ by weight per 100 parts of $TiO_2$, the sulfuric acid strength may range from about 10% to 80% and from about 3 parts to 20 parts by weight per 100 parts of $TiO_2$. Likewise, although the polyvalent sulfate anion is preferably employed because of its cheapness and volatility during calcination, other polyvalent anions or negative radicals may be employed herein, especially those which are white or colorless or which volatilize during calcination. Examples of other polyvalent negative anions or radicals include those of sulfurous acid, oxalic acid, phosphoric acid, tartaric acid, citric acid, boric acid, or the salts of these acids. Although, preferably, white, colorless anions are best adapted for use in the invention, it will be obvious that those anions which are not white or colorless and which exert a desired coloring influence upon the white titanium dioxide may be used, if desired. Examples of such anions include those of chromic acid, arsenic acid, molybdic acid, or their salts, etc. These may be employed in amounts similar to those indicated for the sulfate radical.

Although the invention has been described its preferred adaptation directed to the hydrolys of titanium chloride solutions, it is to be understood that the process is not limited to such mo of hydrolysis, but may be usefully employed in in stances where a raw rutile pigment is to be sep rated from its mother liquor, whether such liquor be hydrochloric acid or another monobasic ac such as nitric, perchloric, hydrobromic, or chlo acetic acid, as would be the case if the corr sponding titanium salt were used in place of titanium chloride. When hydrofluoric acid employed, rutile is not precipitated from solution containing substantial amounts of titaniu fluoride, but this is not the case when hydrolys of solutions of titanium nitrate, perchlorate, bro mide, chloracetates, etc., are employed, and a cordingly the invention is to be considered a applicable to the removal of rutile from the co responding acids, as well as from hydrochlori acid.

I claim as my invention:

1. A process for the production of a rutile pig ment comprising hydrolyzing a solution of a tita nium salt of a monobasic acid from the grou consisting of hydrochloric, nitric, perchlori hydrobromic, and chloracetic to precipitate tita nium dioxide in the rutile crystalline patter during thermal hydrolysis maintaining said solu tion substantially free of polyvalent anions an at a titanium dioxide concentration of not les than about 40 g./l., and thereafter effecting sepa ration of the precipitated pigment from the aci in the presence of polyvalent anions.

2. A process for the production of a rutile pig ment comprising hydrolyzing a solution of a tita nium salt of a monobasic acid from the grou consisting of hydrochloric, nitric, perchloric hydrobromic, and chloracetic to precipitate tita nium dioxide in the rutile crystalline pattern during thermal hydrolysis maintaining said solu tion substantially free of polyvalent anions an at a concentration of not less than about 40 gram of $TiO_2$ per liter, thereafter adding polyvalen anions to an acid mother liquor containing slurry of the precipitated pigment and then separatin said precipitated pigment from the acid mothe liquor.

3. A process for the preparation of a rutile pigment comprising hydrolytically precipitating at an elevated temperature titanium oxide in the rutile crystalline pattern from a solution of a titanium salt of a monobasic acid from the group consisting of hydrochloric, nitric, perchloric, hydrobromic, and chloracetic containing not less than about 40 grams of $TiO_2$ per liter and maintained substantially free of polyvalent anions, adding polyvalent anions to the wet pigment prior to its separation from its acid mother liquor by displacement with water, washing said pigment to remove the acid solution, and thereafter calcining the raw pigment.

4. A process for the production of a rutile pigment, comprising thermally hydrolyzing a titanium chloride solution to precipitate raw rutile titanium dioxide, during hydrolysis maintaining said solution in substantially polyvalent anion-free condition and at a concentration of not less than about 40 grams of $TiO_2$ per liter, thereafter separating the precipitated pigment from the acid mother liquor in the presence of polyvalent anions, and then calcining the recovered raw pigment.

5. A process for the producton of a rutile pigment comprising thermally hydrolyzing a titanium chloride solution to precipitate raw rutile titanium dioxide, during hydrolysis maintaining said solution substantially free of polyvalent anions and at a titanium dioxide concentration from about 60 g./l. to 130 g./l., and thereafter effecting separation of the precipitated pigment from the acid in the presence of polyvalent anions.

6. A process for the production of a rutile pigment comprising thermally hydrolyzing a titanium chloride solution to precipitate raw rutile titanium dioxide, during hydrolysis maintaining the chloride solution substantially free of polyvalent anions and at a titanium dioxide concentration of from about 40 g./l. to 175 g./l., and thereafter effecting separation of the precipitated pigment from the acid liquor in the presence of sulfate ions.

7. A process for the production of a rutile pigment comprising thermally hydrolyzing a solution of a titanium salt of a monobasic acid from the group consisting of hydrochloric, nitric, perchloric, hydrobromic and chloracetic, to precipitate titanium dioxide in the rutile, during hydrolysis maintaining the solution substantially free of polyvalent anions and at a titanium dioxide concentration of from about 40 to about 175 g./l., and thereafter separating the precipitated pigment from the acid in the presence of polyvalent anions.

8. A process for the production of a rutile pigment comprising thermally hydrolyzing a solution of a titanium salt of a monobasic acid from the group consisting of hydrochloric, nitric, perchloric, hydrobromic and chloracetic, to precipitate titanium dioxide in the rutile, during hydrolysis maintaining the solution substantially free of polyvalent anions and at a titanium dioxide concentation of from about 60 to about 130 g./l., and thereafter separating the precipitated pigment from the acid in the presence of polyvalent anions.

9. A process for the production of an improved rutile titanium oxide pigment comprising hydrolyzing a solution of a titanium salt of a monobasic acid from the group consisting of hydrochloric, nitric, perchloric, hydrobromic and chloracetic, to precipitate therefrom raw rutile titanium oxide, during hydrolysis of said solution maintaining the same substantially free of polyvalent anions and at a titanium oxide concentration of not less than about 40 g./l., thereafter separating the precipitated raw rutile from the acid hydrolysis liquor, effecting said separation in the presence of an amount of $H_2SO_4$ equivalent to from about 3 to 20 parts by weight per 100 parts of $TiO_2$, and then calcining the recovered rutile precipitate to develop its pigment properties.

10. A process for the production of a rutile titanium oxide pigment comprising thermally hydrolyzing a titanium chloride solution to precipitate raw rutile titanium oxide, during hydrolysis of said solution maintaining the same substantially free of polyvalent anions and at a titanium oxide concentration of from about 40 to 175 g./l., thereafter separating the precipitated raw rutile from the acid hydrolysis liquor, effecting said separation in the presence of an amount of $H_2SO_4$ equivalent to from about 3 to 20 parts by weight per 100 parts of $TiO_2$, and then calcining the recovered rutile precipitate to develop essential pigment properties.

11. A process for the production of a rutile titanium dioxide pigment comprising thermally hydrolyzing a titanium chloride solution to precipitate raw pigment rutile therefrom, during hydrolysis of said solution maintaining the same substantially free of polyvalent anions and at a titanium dioxide concentration of from about 60 to 130 g./l., cooling the resulting rutile precipitate while suspended in the dilute hydrochloric acid obtained from the hydrolysis precipitation, withdrawing the resulting thickened slurry and diluting the same with sulfuric acid of about 20% strength in an amount equivalent to about 10 parts of $H_2SO_4$ by weight per 100 parts of $TiO_2$, and thereafter filtering, washing and calcining said precipitate.

ROBERT MYERS McKINNEY.

CERTIFICATE OF CORRECTION.

Patent No. 2,237,764.

April 8, 1941.

ROBERT MYERS McKINNEY.

It is hereby certified that error appears in the printed specification of the above numbered patent requiring correction as follows: Page 4, first column, lines 27 and 39, claims 7 and 8 respectively, after the word "rutile" and before the comma insert --crystalline pattern--; and that the said Letters Patent should be read with this correction therein that the same may conform to the record of the case in the Patent Office.

Signed and sealed this 20th day of May, A. D. 1941.

(Seal)

Henry Van Arsdale,
Acting Commissioner of Patents.